(12) United States Patent
Tan et al.

(10) Patent No.: US 8,514,186 B2
(45) Date of Patent: Aug. 20, 2013

(54) HANDHELD ELECTRONIC DEVICE AND OPERATION METHOD THEREOF

(75) Inventors: Yun-Long Tan, Taoyuan (TW); Yi-Shen Wang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1328 days.

(21) Appl. No.: 12/262,317

(22) Filed: Oct. 31, 2008

(65) Prior Publication Data

US 2009/0167706 A1 Jul. 2, 2009

(30) Foreign Application Priority Data

Dec. 28, 2007 (TW) ................................ 96150975 A (51) Int. Cl.
*G06F 3/041* (2006.01)
(52) U.S. Cl.
USPC .................... 345/173; 178/18.01; 345/168
(58) Field of Classification Search
USPC ................. 345/168–169, 173; 715/808, 840; 341/22; 178/18.01; 379/93.19
See application file for complete search history.

(56) References Cited

U.S. PATENT DOCUMENTS

| 6,088,022 | A | 7/2000 | Rakoski |
| 6,562,078 | B1 | 5/2003 | Yang et al. |
| 6,639,584 | B1 | 10/2003 | Li |
| 6,784,873 | B1 | 8/2004 | Boesen et al. |
| 7,071,924 | B2 * | 7/2006 | Wilbrink et al. ............... 345/168 |
| 7,554,529 | B2 * | 6/2009 | Kotipalli ........................ 345/168 |
| 7,602,378 | B2 * | 10/2009 | Kocienda et al. ............. 345/169 |
| 2006/0053387 | A1 * | 3/2006 | Ording ............................ 715/773 |
| 2006/0279532 | A1 | 12/2006 | Olszewski et al. |

FOREIGN PATENT DOCUMENTS

| EP | 1 383 034 | 1/2004 |
| GB | 2 425 700 | 11/2006 |
| WO | WO 00/75765 | 12/2000 |
| WO | WO 2007/014064 | 2/2007 |
| WO | WO 2007/149357 | 12/2007 |

OTHER PUBLICATIONS

Taiwanese language office action dated Nov. 29, 2011.
European Office Action dated Feb. 2, 2012.

\* cited by examiner

*Primary Examiner* — Abbas Abdulselam
(74) *Attorney, Agent, or Firm* — McClure, Qualey & Rodack, LLP (57) ABSTRACT

A handheld electronic device and an operation method thereof are provided. The electronic device includes a virtual keyboard and a touch screen. The virtual keyboard includes a plurality of key sections. The touch screen has an inputting area for showing one of the key sections. When the touch screen detects a sliding movement from a user in the inputting area, the inputting area shows another one of the key sections without showing the other ones of the key sections.

17 Claims, 12 Drawing Sheets

HANDHELD ELECTRONIC DEVICE AND OPERATION METHOD THEREOF

This application claims the benefit of Taiwan application Serial No. 96150975, filed Dec. 28, 2007, the subject matter of which is incorporated herein by reference.

BACKGROUND OF THE INVENTION

1. Field of the Invention

The invention relates in general to an electronic device and an operation method thereof, and more particularly to a handheld electronic device and an operation method thereof.

2. Description of the Related Art

In recent years, the computer and the mobile phone have become indispensable electronic devices for modern people. As the electronic industry is rising and flourishing, the handheld electronic devices, such as the Personal Digital Assistant (PDA), Smart phone, Tablet PC, and Ultra-Mobile PC (UMPC), each of which is provided with functions of computer and mobile phone, are sequentially presented to the market.

The handheld electronic device can be operated by using the stylus or finger to click the touch screen or by using the navigation key directly. Since the handheld electronic device is small in size, the handwriting input or the virtual keyboard input is used for text input in order to save the space for accommodating the physical keyboard.

On many handheld electronic devices, the virtual keyboards are miniature versions of standard-sized Qwerty keyboard in appearance and shown on the touch screen of the handheld electronic device. It is common for users to input text by tapping a virtual keyboard built into the operating system of the handheld electronic device and then to click the touch screen by using the stylus. However, some letter arrangements, symbols, and characters are not placed on the default virtual keyboard. Users have to switch layout modes by pressing a predefined button on the present layout screen. When the text for input includes the Chinese characters, English letters and even the symbols, the frequency of switching layout modes becomes higher and switching layout modes in this manner is a dull and boring task for the user. Thus, it makes the text inputting complex.

SUMMARY OF THE INVENTION

The invention is directed to a handheld electronic device and an operation method thereof, which allows users to quickly switch layout modes for showing different key sections on the touch screen during the inputting process.

According to a first aspect of the present invention, a handheld electronic device is provided. The device comprises: a virtual keyboard, and a touch screen. The virtual keyboard comprises a plurality of key sections. The touch screen has an inputting area for showing one of the key sections. When the touch screen detects a sliding movement from a user in the inputting area, the inputting area shows another one of the key sections without showing the other ones of the key sections.

According to a second aspect of the present invention, an operating method of a handheld electronic device is provided. The method comprises the following steps: First, a virtual keyboard comprising a plurality of key sections is actuated, wherein a touch screen of the electronic device shows one of the key sections. Then, a sliding movement from a user in the inputting area is detected. At this time, another one of the key sections is shown without showing the other ones of the key sections. Lastly, a pressing movement from the user in the another one of key sections is detected and an input action is performed accordingly.

The invention will become apparent from the following detailed description of the preferred but non-limiting embodiments. The following description is made with reference to the accompanying drawings.

DETAILED DESCRIPTION OF THE INVENTION

Figure 1A:
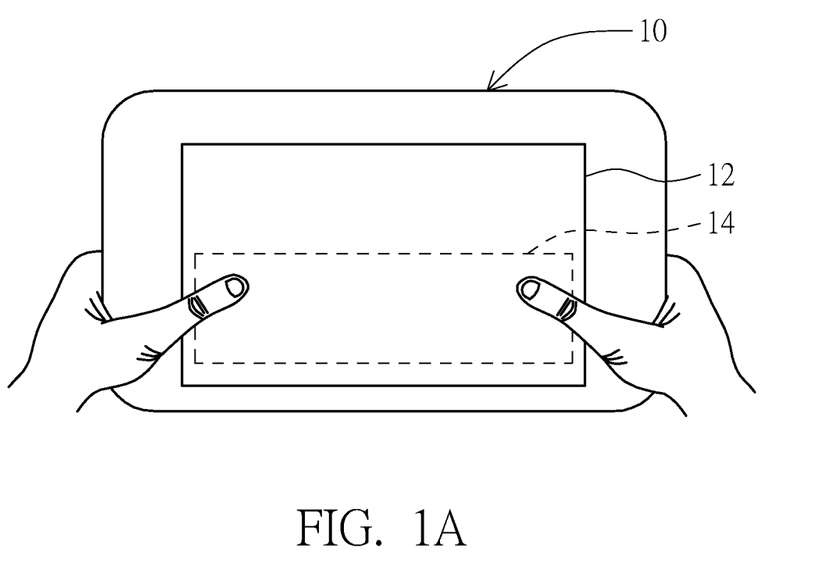
FIG. 1A shows a handheld electronic device operated by a finger touch.

The operation method of the handheld electronic device according to the invention can be applied to a Personal Digital Assistant (PDA), Smart phone, Tablet PC, Ultra-Mobile PC (UMPC) and other electronic device having a touch screen. Please refer to FIG. 1A, showing a handheld electronic device operated by a finger touch. The handheld electronic device 10 at least comprises a touch screen 12 having an inputting area 14. The inputting area 14 is disposed at the lower portion of the touch screen 12 so as to be directly touched by the user when the user holds the handheld electronic device 10. Preferably, the handheld electronic device is a UMPC, the size of which is between those of the notebook computer and the PDA so as to be held by two hands and therefore can be directly operated by fingers to perform an input action.

First Embodiment

Figure 1B:
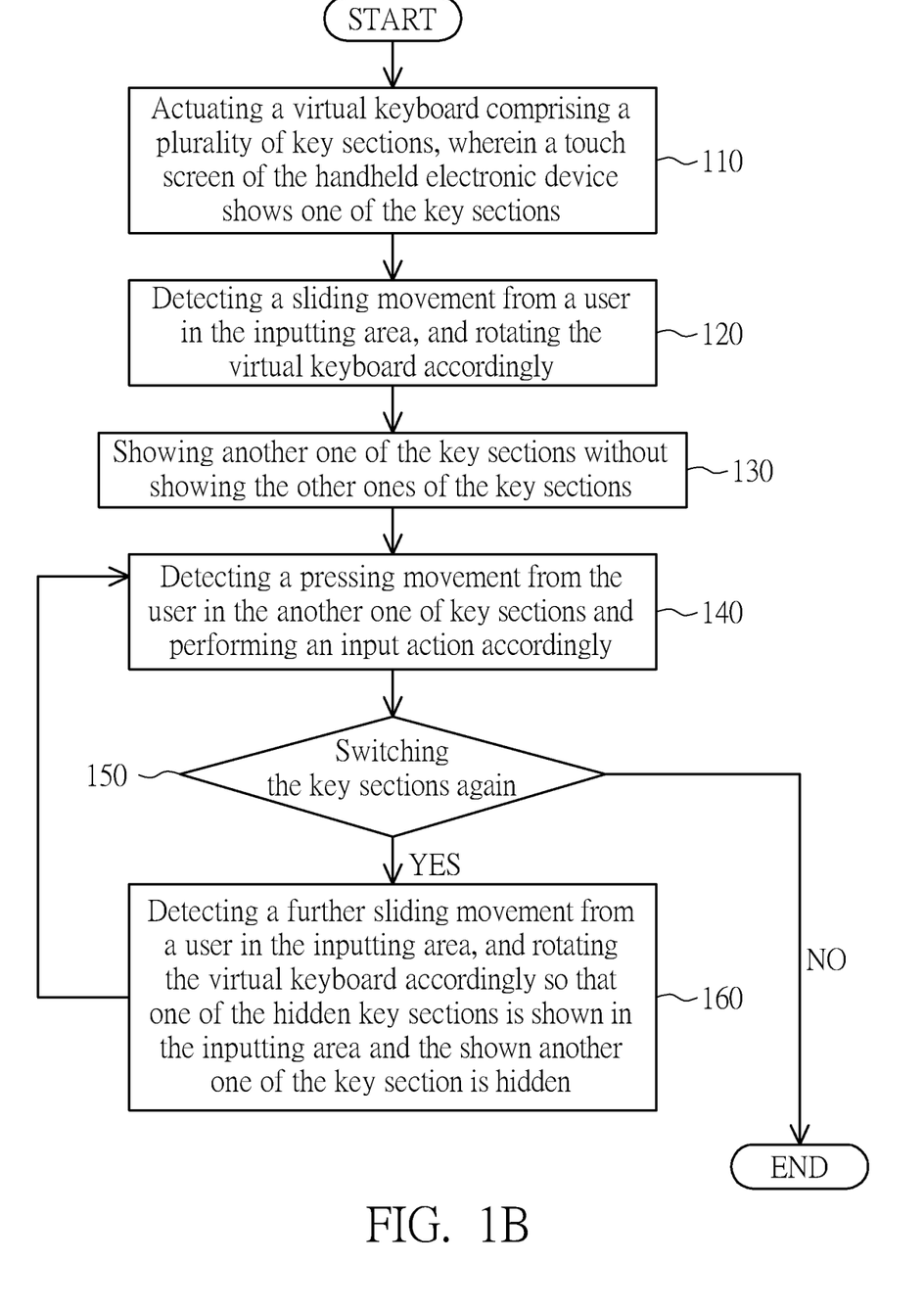
FIG. 1B is a flow chart of an operation method of the handheld electronic device according to a first embodiment of the invention.

Please refer to FIG. 1B, showing a flow chart of an operation method of the handheld electronic device according to a first embodiment of the invention; please also refer to FIG. 1A. The operation method of the handheld electronic device 10 includes the following steps: First, the method starts from step 110 to actuate a virtual keyboard (not shown in FIG. 1A) comprising a plurality of key sections, wherein a touch screen 12 of the handheld electronic device 10 shows one of the key sections in the inputting area 14. Then, in step 120, a sliding movement from a user in the inputting area 14 is detected, and the virtual keyboard is rotated accordingly so as to switch the key sections of the virtual keyboard. The sliding movement can be a horizontal movement, a vertical movement, a clockwise movement, a counterclockwise movement, or a curvilinear movement. Subsequently, in step 130, another one of the key sections is shown in the inputting area 14 without showing the other ones of the key sections. That is, the originally shown key section and the other key sections are hidden. Lastly, in step 140, a pressing movement from the user is detected in the another one of key sections and an input action is performed accordingly.

The operation method according to the first embodiment of the invention further includes step 150 to determine whether the key sections are switched again. If the key sections are not switched, the method ends after finishing the inputting. If the key sections need to be further switched, in step 160, a further sliding movement from a user in the inputting area 14 is detected to rotate the virtual keyboard accordingly so that one of the hidden key sections is shown in the inputting area 14 and the shown another one of the key section is hidden. Then, the method returns to the step 140 to perform the input action. It is noted that the key section for receiving the pressing movement is the currently shown key section after performing switching to hide the originally shown key section. Thereafter, in step 150, the user can depend on his need to determine whether to continue the step 160 or to end the method.

The operation method according to the first embodiment can further includes the step 120 of generating a first sound responsive to the sliding movement of switching the key sections and also can further includes the step 140 of generating a second sound responsive to the pressing movement on the shown key section.

The virtual keyboard described in the operation method according to the present embodiment of the invention can be a pillar-shaped keyboard, a plate-shaped keyboard, a sphere-shaped keyboard or other rotatable keyboard. The virtual keyboard includes several key sections. Preferably, the key sections include an alphabet key section, a number key section, a symbol key section and a character key section. Besides, the key sections can have different bottom designs, different colors, or different typefaces.

Figure 2A:
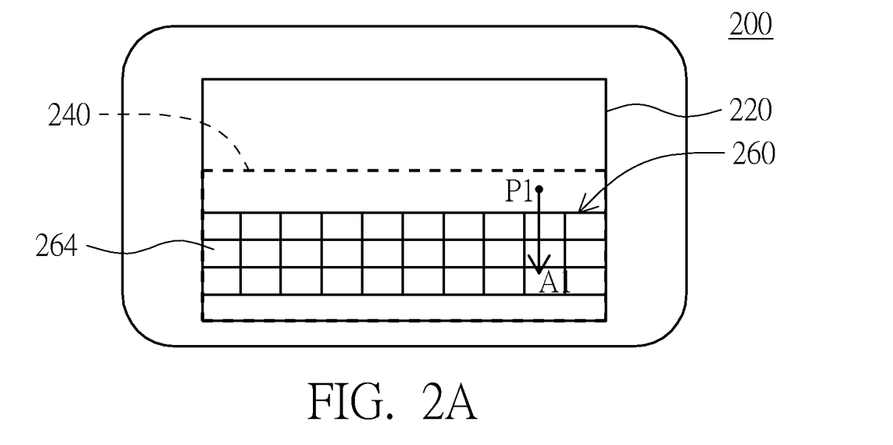
FIGS. 2A and 2B illustrate the operation of a handheld electronic device having a pillar-shaped keyboard according to the first embodiment of the invention.
Figure 2B:
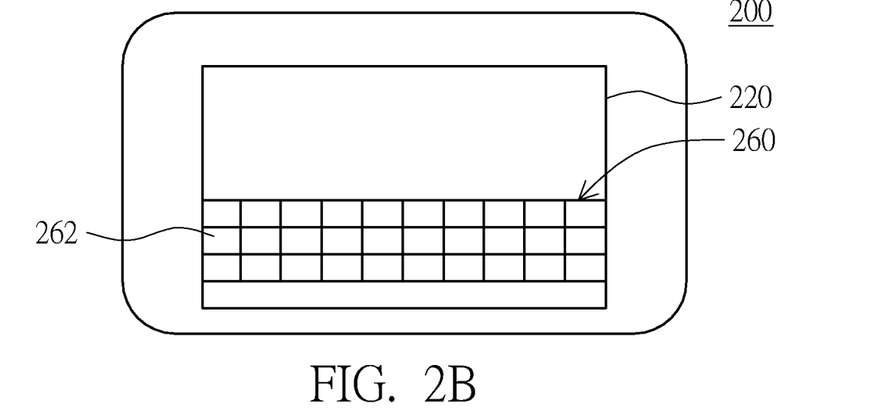
Figure 2C:
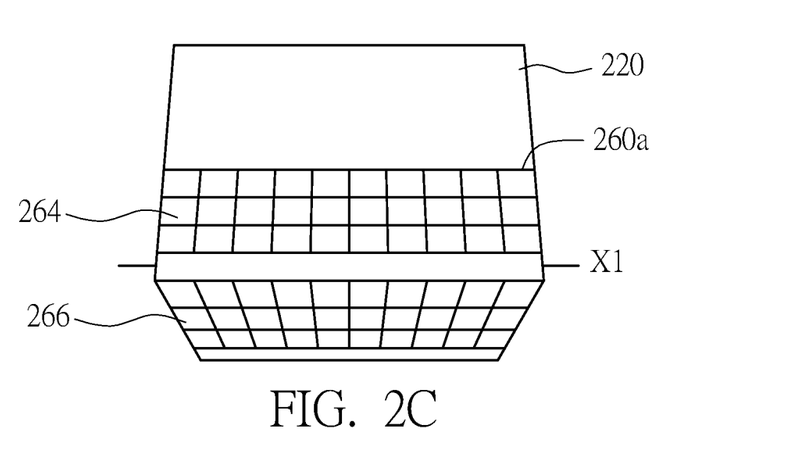
FIG. 2C is a perspective view of the pillar-shaped keyboard in FIG. 2A.

Please refer to FIGS. 2A and 2B, illustrating the operation of a handheld electronic device having a pillar-shaped keyboard according to the first embodiment of the invention. The handheld electronic device 200 comprises a pillar-shaped keyboard 260 and a touch screen 220 having an inputting area 240. FIG. 2C is a perspective view of the pillar-shaped keyboard in FIG. 2A. The pillar-shaped keyboard 260 has several rectangular surfaces 260a and includes several key sections 262 (in FIG. 2B), 264 and 266 (in FIG. 2C). The key sections 262, 264 and 266 are successively arranged along the rectangular surfaces 260a. The inputting area 240 provides users to rotate the pillar-shaped keyboard 260 so as to switch the key sections 262, 264 and 266.

As shown in FIG. 2A, the key section 264 is shown in the inputting area 240 and other key sections are hidden. At this time, the inputting area 240 provides users to press the shown key section 264. When the user wants to switch the shown key section 264 to another key section, the user can click and drag any point P1 in the inputting area 240 to move along the direction A1. Thus, the pillar-shaped keyboard 260 can rotate around the axis X1 so as to show different key sections. In more detail, the touch screen 220 detects the sliding movement in the inputting area 240, and then the pillar-shaped keyboard 260 rotates from an angle to another angle as the point P1 moves. Therefore, the key section 264 corresponding to the angle is immediately hidden while the key section 262 corresponding to the another angle is immediately shown. That is, the key section 264 in FIG. 2A is automatically switched to the key section 262 in FIG. 2B.

Figure 3A:
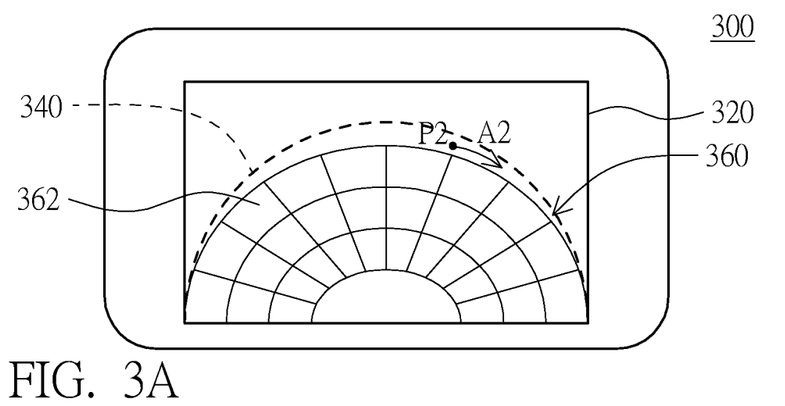
FIGS. 3A and 3B illustrate the operation of a handheld electronic device having a plate-shaped keyboard according to the first embodiment of the invention.
Figure 3B:
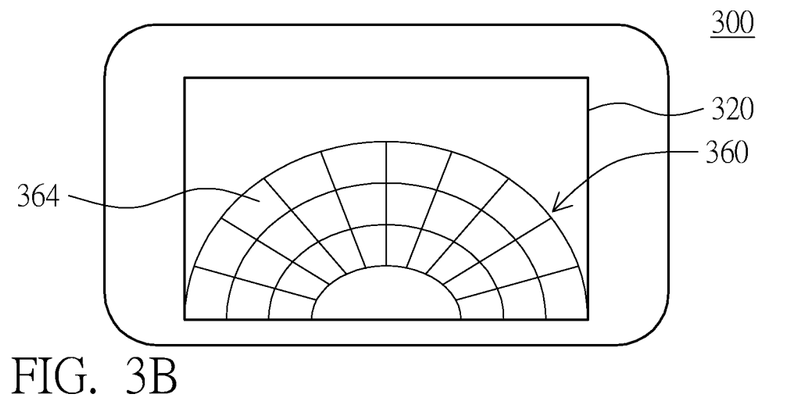
Figure 3C:
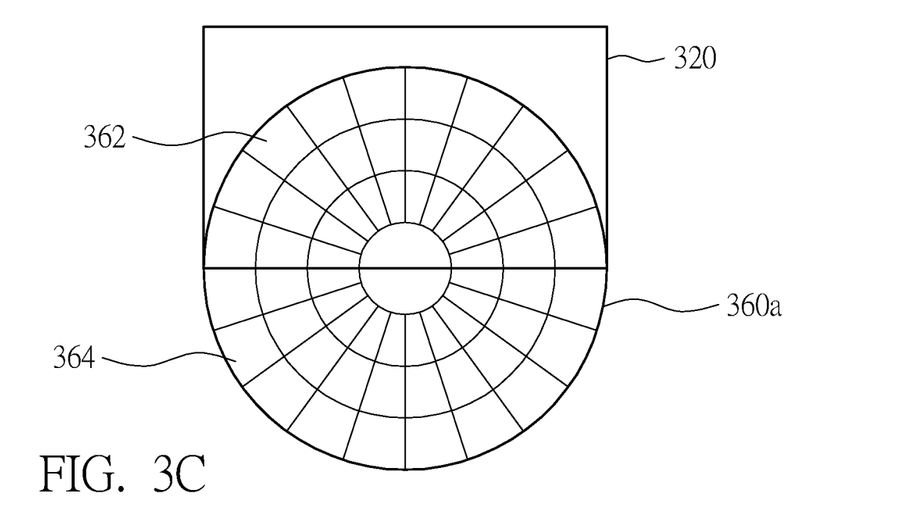
FIG. 3C is a perspective view of the plate-shaped keyboard in FIG. 3A.

Please refer to FIGS. 3A and 3B, illustrating the operation of a handheld electronic device having a plate-shaped keyboard according to the first embodiment of the invention. The handheld electronic device 300 comprises a plate-shaped keyboard 360 and a touch screen 320 having an inputting area 340. FIG. 3C is a perspective view of the plate-shaped keyboard in FIG. 3A. The plate-shaped keyboard 360 has a circular surface 360a and includes several key sections 362 and 364, which are sector-shaped. Besides, the key sections 362 and 364 are successively arranged on the circular surface 360a. The inputting area 340 provides users to rotate the plate-shaped keyboard 360 so as to switch the key sections 362 and 364.

As shown in FIG. 3A, the key section 362 is shown in the inputting area 340 and other key sections are hidden. At this time, the inputting area 340 provides users to press the shown key section 362. When the user wants to switch the shown key section 362 to another key section, the user can click and drag any point P2 in the inputting area 340 to move along the direction A2. The direction A2 is substantially a clockwise or counterclockwise direction. When the touch screen 320 detects the sliding movement in the inputting area 340, the pillar-shaped keyboard 360 rotates from an angle to another angle as the point P2 moves. Therefore, the key section 362 corresponding to the angle is immediately hidden while the key section 364 corresponding to the another angle is immediately shown. That is, the key section 362 in FIG. 3A is automatically switched to the key section 364 in FIG. 3B.

Figure 4A:
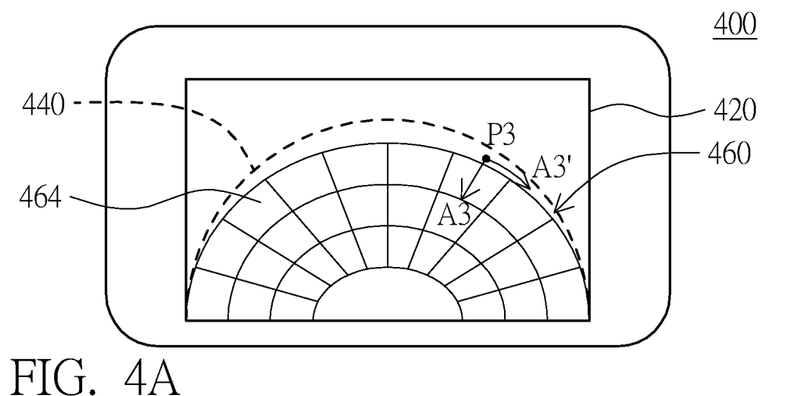
FIGS. 4A and 4B illustrate the operation of a handheld electronic device having a sphere-shaped keyboard according to the first embodiment of the invention.
Figure 4B:
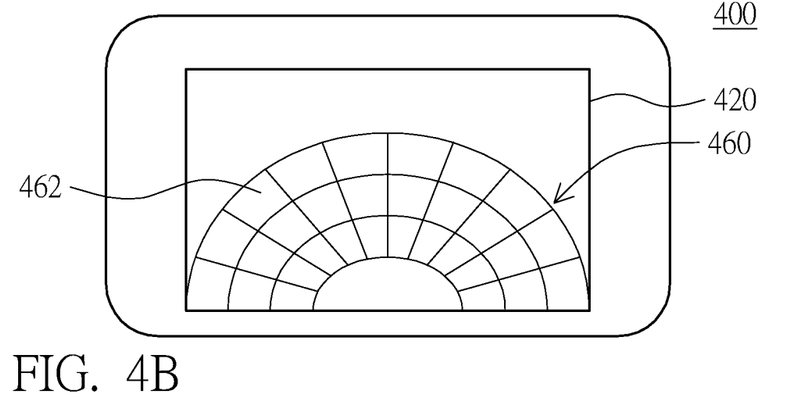
Figure 4C:
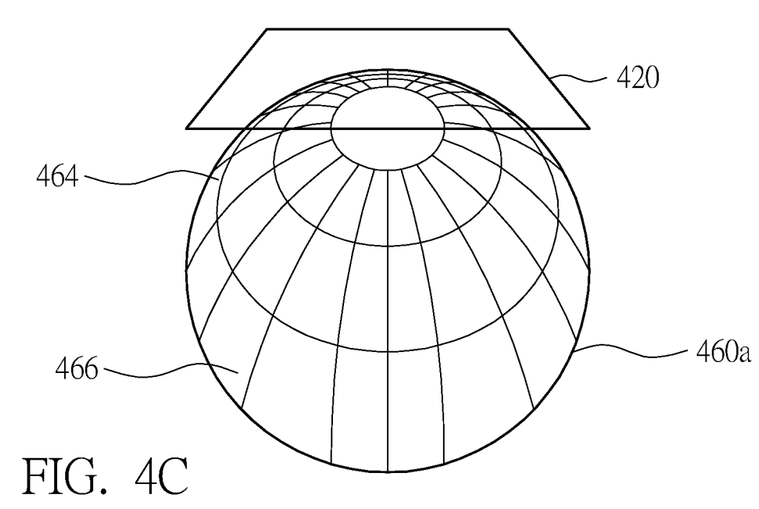
FIG. 4C is a perspective view of the sphere-shaped keyboard in FIG. 4A.

Please refer to FIGS. 4A and 4B, illustrating the operation of a handheld electronic device having a sphere-shaped keyboard according to the first embodiment of the invention. The handheld electronic device 400 comprises a sphere-shaped keyboard 460 and a touch screen 420 having an inputting area 440. FIG. 4C is a perspective view of the sphere-shaped keyboard in FIG. 4A. The sphere-shaped keyboard 460 has a spherical surface 460a and includes several key sections 462 (in FIG. 4B), 464 and 466 (in FIG. 4C), which are spherical sector-shaped. Besides, the key sections 462, 464 and 466 are successively arranged on the spherical surface 460a. The inputting area 440 provides users to rotate the sphere-shaped keyboard 460 so as to switch the key sections 462, 464 and 466.

As shown in FIG. 4A, the key section 464 is shown in the inputting area 440 and other key sections are hidden. At this time, the inputting area 440 provides users to press the shown key section 464. When the user wants to switch the shown key section 464 to another key section, the user can click and drag any point P3 in the inputting area 440 to move along the direction A3 or A3'. When the touch screen 420 detects the sliding movement in the inputting area 440, the sphere-shaped keyboard 460 rotates from an angle to another angle as the point P3 moves. Therefore, the key section 464 corresponding to the angle is immediately hidden while the key section 462 or 466 corresponding to the another angle is immediately shown. That is, the key section 464 in FIG. 4A is automatically switched to the key section 462 in FIG. 4B as the point P3 moves along the direction A3, or the key section 464 in FIG. 4A is automatically switched to the key section 466 in FIG. 4C as the point P3 moves along the direction A3'.

Second Embodiment

Figure 5A:
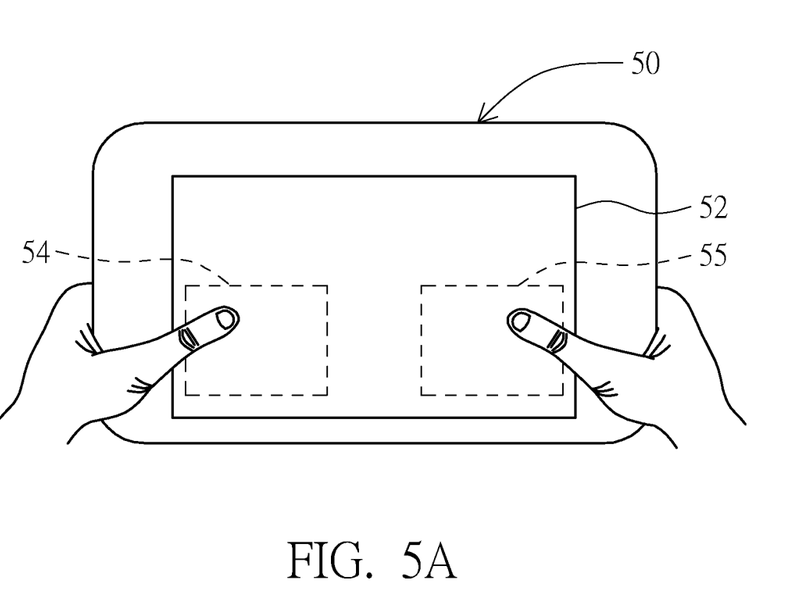
FIG. 5A shows another handheld electronic device operated by a finger touch.
Figure 5B:
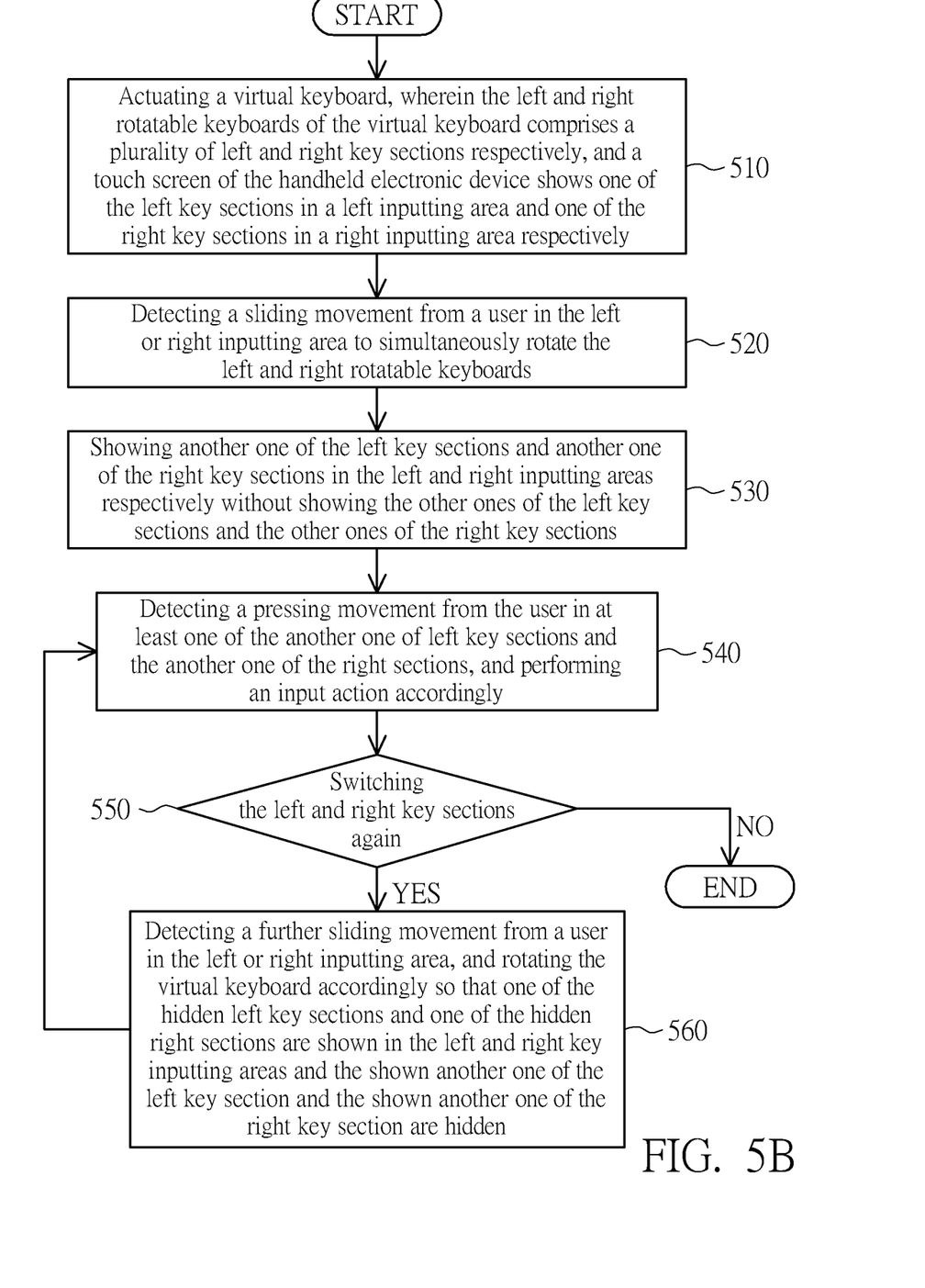
FIG. 5B is a flow chart of an operation method of the handheld electronic device according to a second embodiment of the invention.

Please refer to FIG. 5B, showing a flow chart of an operation method of the handheld electronic device according to a second embodiment of the invention; please also refer to FIG. 5A. The operation method of the handheld electronic device 50 includes the following steps: First, the method starts from step 510 to actuate a virtual keyboard (not shown in FIG. 5A), wherein left and right rotatable keyboards comprises a plurality of left and right key sections respectively, and a touch screen 52 of the handheld electronic device 50 shows one of the left key sections in the left inputting area 54 and one of the right key sections in the right inputting area 55 respectively. Then, in step 520, a sliding movement from a user in the left or right inputting areas 54 or 55 is detected, and the left and right rotatable keyboards are rotated accordingly so as to switch the left key sections of the left rotatable keyboards and the right key sections of the right rotatable keyboards. The sliding movement can be a horizontal movement, a vertical movement, a clockwise movement, a counterclockwise movement, or a curvilinear movement. Subsequently, in step 530, another one of the left key sections and another one of the right key sections are shown in the left and right inputting areas 54 and 55 respectively without showing the other ones of the left key sections and the other ones of the right key sections. That is, the originally shown left and right key sections and the other left and right key sections are hidden. Lastly, in step 540, a pressing movement from the user is detected in at least one of the another one of left key sections and the another one of the right sections, and an input action is performed accordingly.

The operation method according to the present embodiment of the invention further includes step 550 to determine whether the key sections are switched again. If the key sections are not switched, the method ends after finishing the inputting. If the key sections are further switched, in step 560, a further sliding movement from a user in the left or right inputting area is detected to rotate the left and right rotatable keyboard accordingly so that one of the hidden left key sections and one of the hidden right key sections are shown in the left and right inputting areas respectively and the shown another one of the left key section and the shown another one of the right key section are hidden. Then, the method returns to the step 540 to perform the input action. It is noted that the left or right key section for receiving the pressing movement is the currently shown left or right key section after performing switching to hide the originally shown left and right key sections. Thereafter, in step 550, the user can depend on his need to determine whether to continue the step 560 or to end the method.

The operation method according to the present embodiment can further includes the step 520 of generating a first sound responsive to the sliding movement of switching the left or right key section and also can further includes the step 540 of generating a second sound responsive to the pressing movement on the shown left or right key section.

The left and right rotatable keyboards of the virtual keyboard described in the operation method according to the present embodiment of the invention can be a dual pillar-shaped keyboard, a dual plate-shaped keyboard, a dual sphere-shaped keyboard or other rotatable dual keyboards. The virtual keyboard includes several key sections. Preferably, the left and right key sections include a set of alphabet key sections, a set of number key sections, a set of symbol key sections and a set of character key sections. Besides, the left and right key sections can have different bottom designs, different colors, or different typefaces.

The main differences between the first and second embodiments lie in that the virtual keyboard according to the second embodiment has a dual-keyboard design to include left and right rotatable keyboards. Besides, the left and right key sections shown in the left and right inputting areas correspond to each other and can equally provide the same input method allowing users to input alphabets, numbers, symbols, or characters in the left and right inputting areas simultaneously. Besides, the left and right inputting areas correspond to each other in bottom designs, colors, or typefaces. Preferably, the left and right inputting areas are disposed at the left and right corners of the touch screen so that the user's two hands can correspond to the left and right inputting areas while holding the handheld electronic device so as to directly operate it by a finger touch to perform an input action. In particular, as long as the user touches and rotates one of the left and right rotatable keyboards by using one finger, the other one of the left and right rotatable keyboards will rotate synchronously.

Figure 6A:
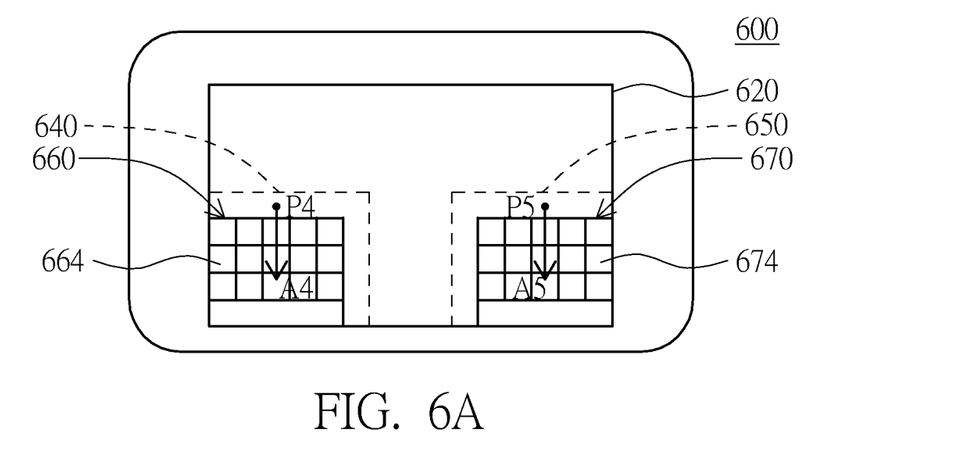
FIGS. 6A and 6B illustrate the operation of a handheld electronic device having a dual pillar-shaped keyboard according to the second embodiment of the invention.
Figure 6B:
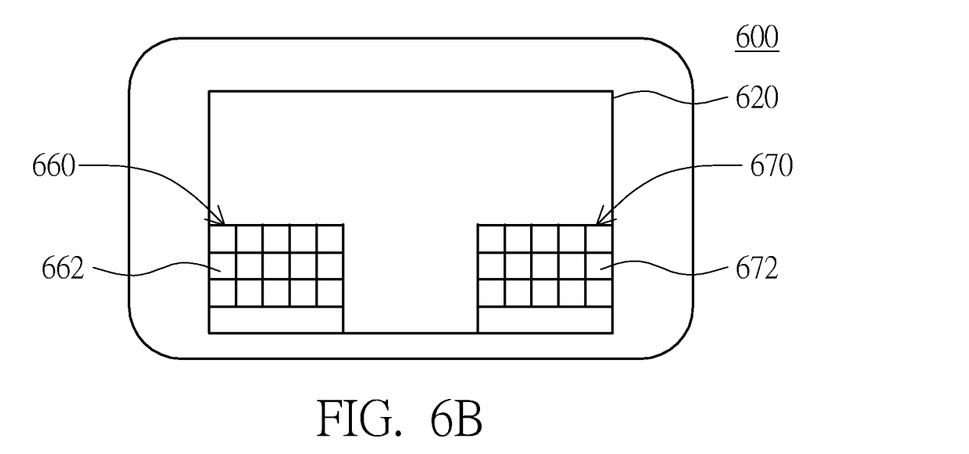
Figure 6C:
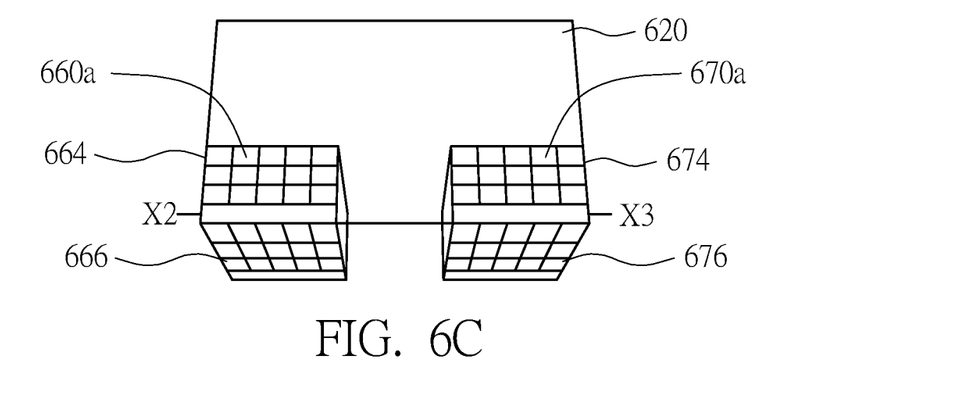
FIG. 6C is a perspective view of the dual pillar-shaped keyboard in FIG. 6A.

Please refer to FIGS. 6A and 6B, illustrating the operation of a handheld electronic device having a dual pillar-shaped keyboard according to the second embodiment of the invention. The handheld electronic device 600 comprises a dual pillar-shaped keyboard and a touch screen 620. The dual pillar-shaped keyboard includes left and right rotatable keyboards 660 and 670, and the touch screen 620 has left and right inputting areas 640 and 650 correspondingly. FIG. 6C is a perspective view of the dual pillar-shaped keyboard in FIG. 6A. Both of the left and right rotatable keyboards 660 and 670 are pillar-shaped keyboards. The left and right rotatable keyboards 660 and 670 have several rectangular surfaces 660a and 670a and include several left key sections 662 (in FIG. 6B), 664 and 666 (in FIG. 6C) and several right key section 672 (in FIG. 6B), 674 and 676 (in FIG. 6C). The left key sections 662, 664 and 666 and the right key sections 672, 674 and 676 are successively arranged along the rectangular surfaces 660a and 670a respectively. The left and right inputting area 640 and 650 provide users to rotate the left and right rotatable keyboards 660 and 670 so as to switch the left key sections 662, 664 and 666 and the right key sections 672, 674 and 676.

As shown in FIG. 6A, the left and right key sections 664 and 674 are shown in the left and right inputting areas 640 and 650 and other left and right key sections are hidden. At this time, the left and right inputting areas 640 and 650 provide users to press the shown left and right key section 664 and 674. When the user wants to switch the shown left and right key section 664 and 674 to another left and right key sections, the user can click and drag any point P4 in the left inputting area 640 to move along the direction A4. Thus, the left rotatable keyboard 660 can rotate around the axis X2 so as to show different left key sections. In more detail, the touch screen 620 detects the sliding movement in the left inputting area 640, and then the left rotatable keyboard 660 rotates from a first angle to another first angle as the point P4 moves. Therefore, the left key section 664 corresponding to the first angle is immediately hidden while the left key section 662 corresponding to the another first angle is immediately shown. That is, the left key section 664 in FIG. 6A is automatically switched to the left key section 662 in FIG. 6B. Similarly, as the left rotatable keyboard 660 rotates, the right rotatable keyboard 670 rotates from a second angle to another second angle. Therefore, the right key section 674 corresponding to the second angle is immediately hidden while the right key section 672 corresponding to the another second angle is immediately shown. That is, the right key section 674 in FIG. 6A is automatically switched to the right key section 672 in FIG. 6B. Besides, the user also can click and drag any point P5 in the right inputting area 650 to move along the direction A5. Thus, the right rotatable keyboard 670 can rotate around the axis X3 so as to show different right key sections. In more detail, the touch screen 620 detects the sliding movement in the right inputting area 650, and then the right rotatable keyboard 670 rotates from a second angle to another second angle as the point P5 moves. Therefore, the right key section 674 corresponding to the second angle is immediately hidden while the right key section 672 corresponding to the another second angle is immediately shown. That is, the right key section 674 in FIG. 6A is automatically switched to the right key section 672 in FIG. 6B. Similarly, as the right rotatable keyboard 670 rotates, the left rotatable keyboard 660 rotates from the first angle to the another first angle. Therefore, the left key section 664 corresponding to the first angle is immediately hidden while the left key section 662 corresponding to the another first angle is immediately shown. That is, the left key section 664 in FIG. 6A is automatically switched to the left key section 662 in FIG. 6B.

Figure 7A:
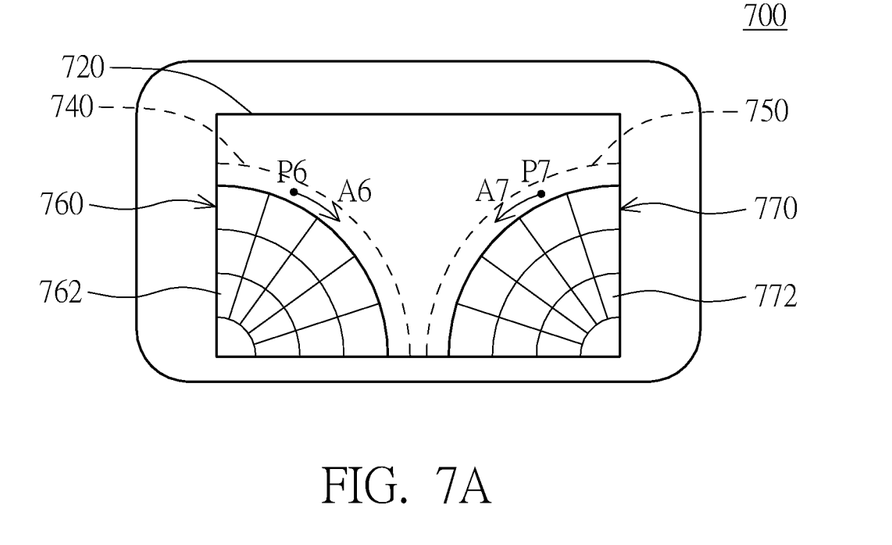
FIGS. 7A and 7B illustrate the operation of a handheld electronic device having a dual plate-shaped keyboard according to the second embodiment of the invention.
Figure 7B:
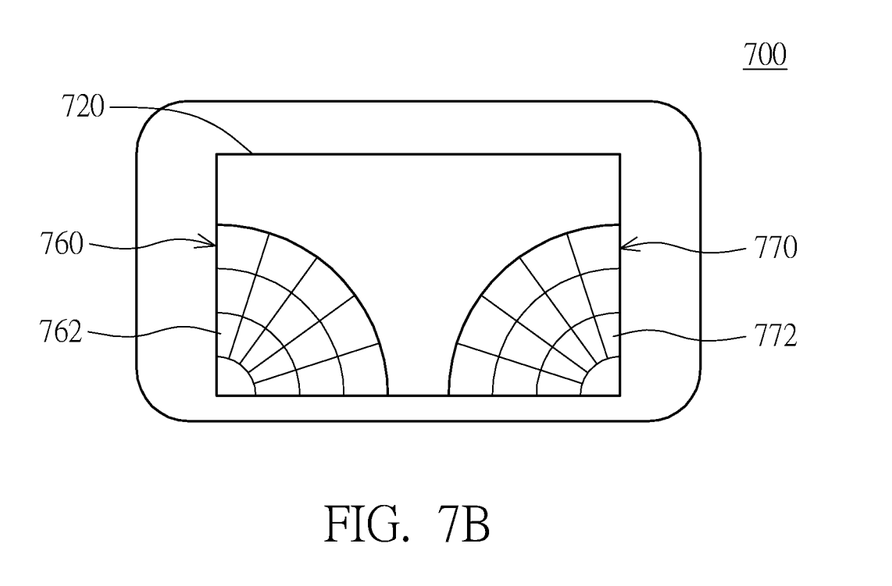
Figure 7C:
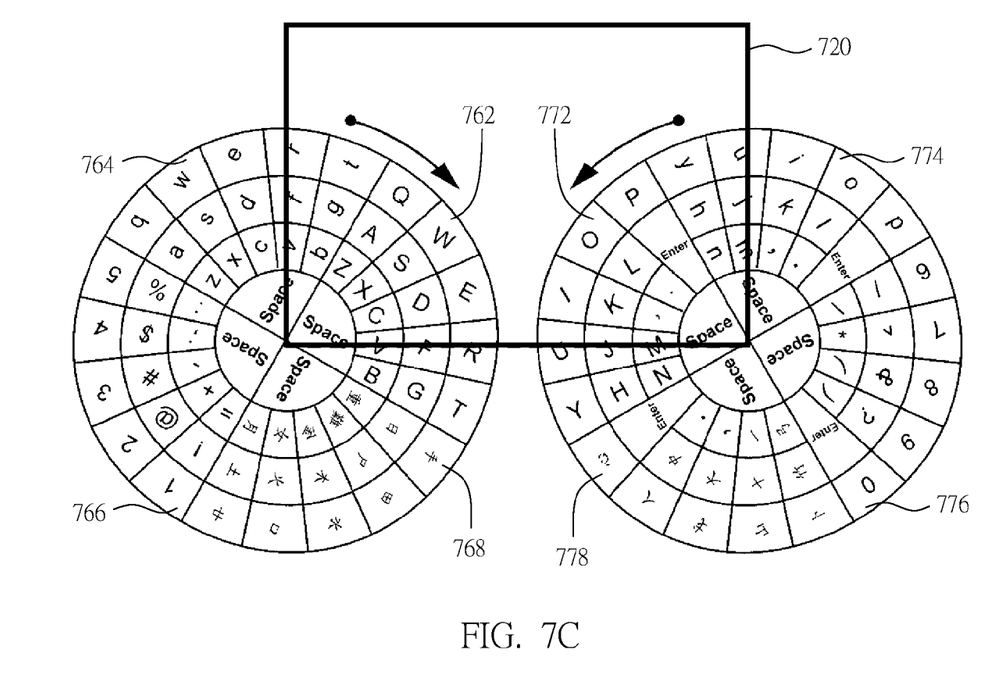
FIG. 7C is a perspective view of the dual plate-shaped keyboard in FIG. 7A.

Please refer to FIGS. 7A and 7B, illustrating the operation of a handheld electronic device having a dual plate-shaped keyboard according to the second embodiment of the invention. The handheld electronic device 700 comprises a dual plate-shaped keyboard and a touch screen 720. The dual plate-shaped keyboard includes left and right rotatable keyboards 660 and 670, and the touch screen 720 has left and right inputting areas 740 and 750. FIG. 7C is a perspective view of the dual plate-shaped keyboard in FIG. 7A. The left and right rotatable keyboards 760 and 770 of the dual plate-shaped keyboard have circular surfaces 760a and 770a and include several left key sections 762, 764, 766 and 768 and several right key sections 772, 774, 776 and 778, which are sector-shaped. Besides, the left key sections 762, 764, 766 and 768 and the right key sections 772, 774, 776 and 778 are successively arranged on the circular surfaces 760a and 770a respectively. The left and right inputting areas 740 and 750 provide users to rotate the left and right rotatable keyboards 760 and 770 so as to switch the left key sections 762, 764, 766 and 768 and the right key sections 772, 774, 776 and 778.

As shown in FIG. 7A, the left and right key sections 762 and 772 are shown in the left and right inputting areas 740 and 750 and other left and right key sections are hidden. At this time, the left and right inputting area 740 and 750 provide users to press the shown left and right key sections 762 and 772, and the shown left and right key sections 762 and 772 correspond to each other in content and action. When the user wants to switch the shown left and right key sections 762 and 772 to another left and right key sections, the user can click and drag any point P6 in the left inputting area 740 to move along the direction A6. The direction A6 is substantially a clockwise or counterclockwise direction. Since the touch screen 720 detects the sliding movement in the left inputting area 740, the left rotatable keyboard 760 rotates from a first angle to another first angle as the point P6 moves. Therefore, the left key section 762 corresponding to the first angle is immediately hidden while the left key section 764 corresponding to the another first angle is immediately shown. That is, the left key section 762 in FIG. 7A is automatically switched to the left key section 764 in FIG. 7B. Similarly, as the left rotatable keyboard 760 rotates, the right rotatable keyboard 770 rotates from a second angle to another second angle. Therefore, the right key section 772 corresponding to the second angle is immediately hidden while the right key section 774 corresponding to the another second angle is immediately shown. That is, the right key section 774 in FIG. 7A is automatically switched to the right key section 772 in FIG. 7B. Besides, the user also can click and drag any point P7 in the right inputting area 750 to move along the direction A7 so as to show different right key sections. The direction A7 substantially is a clockwise direction or counterclockwise direction. In more detail, the touch screen 720 detects the sliding movement in the right inputting area 750, and then the right rotatable keyboard 770 rotates from a second angle to another second angle as the point P7 moves. Therefore, the right key section 772 corresponding to the second angle is immediately hidden while the right key section 774 corresponding to the another second angle is immediately shown. That is, the right key section 772 in FIG. 7A is automatically switched to the right key section 774 in FIG. 7B. Similarly, as the right rotatable keyboard 770 rotates, the left rotatable keyboard 760 rotates from the first angle to the another first angle.

Figure 7D:
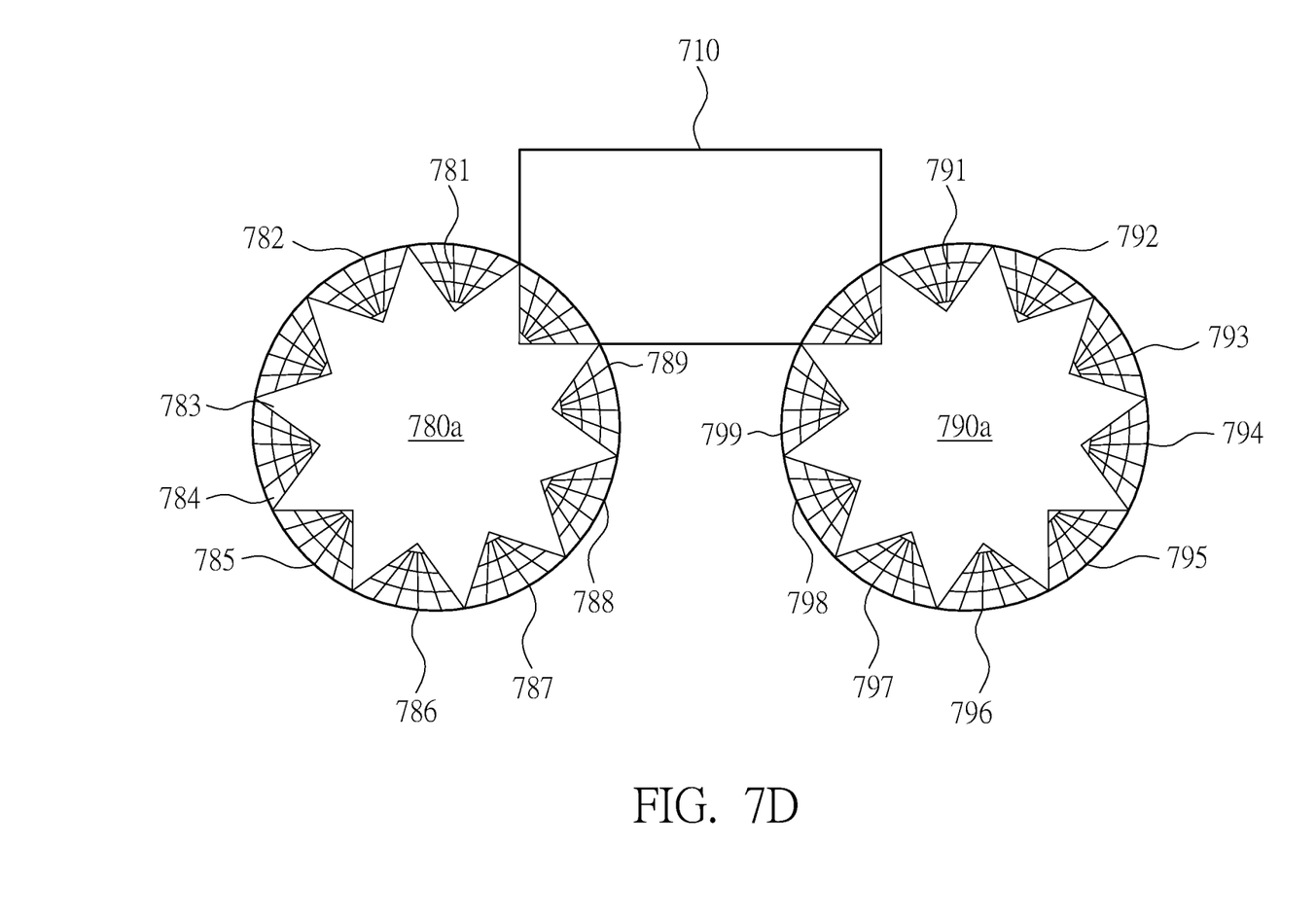
FIG. 7D is a perspective view of another dual plate-shaped keyboard.

Please refer to FIG. 7D, showing another dual plate-shaped keyboard. The above-mentioned dual plate-shaped keyboard in FIG. 7C includes four left key sections 762, 764, 766 and 768 and four right key sections 772, 774, 776 and 778, while the another dual plate-shaped keyboard in FIG. 7D includes ten left key sections 780, 781, 782, 783, 784, 785, 786, 787, 788 and 789 and ten right key sections 790, 791, 792, 793, 794, 795, 796, 797, 798 and 799. As compared with the dual plate-shaped keyboard in FIG. 7C, the another dual plate-shaped keyboard in FIG. 7D can include more left and right key sections so as to provide the user with more input switch options to select required left and right key sections for being shown in the touch screen 710. Therefore, according to the design shown in FIG. 7D, when the circular surfaces 780a and 790a of the dual plate-shaped keyboard have larger areas, more sector areas can be disposed thereon for being the left and right key sections.

Figure 8A:
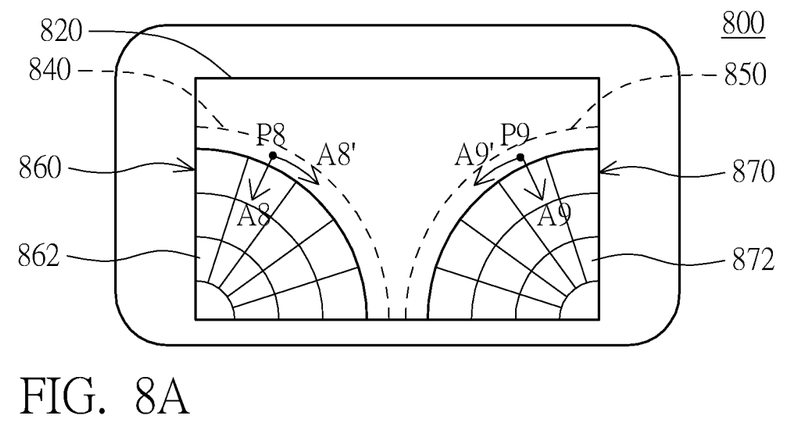
FIGS. 8A and 8B illustrate the operation of a handheld electronic device having a dual sphere-shaped keyboard according to the second embodiment of the invention.
Figure 8B:
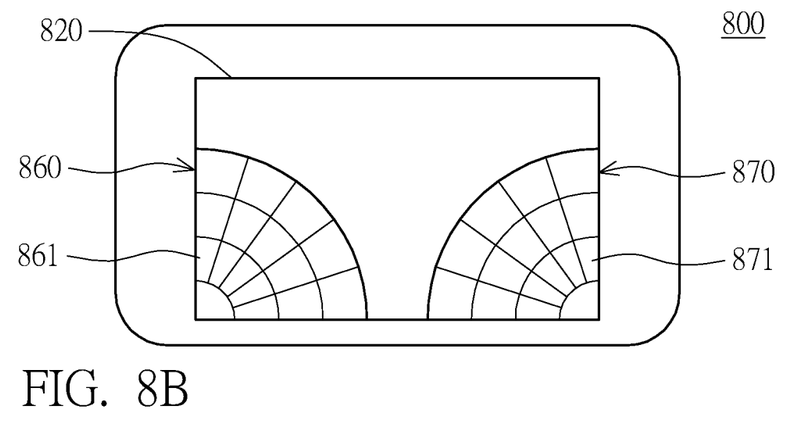
Figure 8C:
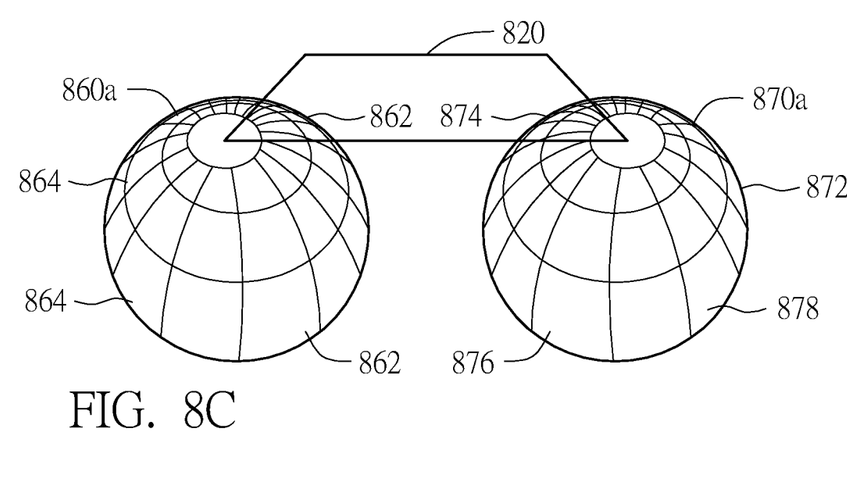
FIG. 8C is a perspective view of the dual sphere-shaped keyboard in FIG. 8A.

Please refer to FIGS. 8A and 8B, illustrating the operation of a handheld electronic device having a dual sphere-shaped keyboard according to the second embodiment of the invention. The handheld electronic device 800 comprises a dual sphere-shaped keyboard and a touch screen 820 having left and right inputting areas 840 and 850. The dual sphere-shaped keyboard includes left and right rotatable keyboards 860 and 870. FIG. 8C is a perspective view of the dual sphere-shaped keyboard in FIG. 8A. The left and right rotatable keyboards 860 and 870 of the dual sphere-shaped keyboard have spherical surfaces 860a and 870a respectively and include several left key sections 861 (in FIG. 8B), 862, 864, 866 and 868 (in FIG. 8C) and several right key sections 871 (in FIG. 8B), 872, 874, 876 and 878 (in FIG. 8C), which are spherical sector-shaped. Besides, the left key sections 861, 862, 864, 866 and 868 and the right key sections 871, 872, 874, 876 and 878 are successively arranged on the spherical surfaces 860a and 870a. The left and right inputting areas 840 and 850 provide users to rotate the left and right rotatable keyboards 860 and 870 of the dual sphere-shaped keyboard so as to switch the left key sections 861, 862, 864, 866 and 868 and the right key sections 871, 872, 874, 876 and 878.

As shown in FIG. 8A, the left and right key sections 862 and 872 are shown in the left and right inputting areas 840 and 850 and other key sections are hidden. At this time, the left and right inputting areas 840 and 850 provide users to press the shown left and right key sections 862 and 872. When the user wants to switch the shown key sections 862 and 872 to another left and right key sections, the user can click and drag any point P8 in the left inputting area 840 to move along the direction A8 or A8'. Since the touch screen 820 detects the sliding movement in the inputting area, the left rotatable keyboard 860 rotates from a first angle to another first angle as the point P8 moves. Therefore, the left key section 862 corresponding to the first angle is immediately hidden while the key section 861 or 864 corresponding to the another first angle is immediately shown. That is, the key section 862 in FIG. 8A is automatically switched to the key section 861 in FIG. 8B as the point P8 moves along the direction A8, or the key section 862 in FIG. 8A is automatically switched to the key section 864 in FIG. 8C as the point P8 moves along the direction A8'. Similarly, as the left rotatable keyboard 860 rotates, the right rotatable keyboard 870 rotates from a second angle to another second angle. Therefore, the right key section 872 corresponding to the second angle is immediately hidden while the right key section 871 or 874 corresponding to the another second angle is immediately shown. That is, the right key section 872 in FIG. 8A is automatically switched to the right key section 871 in FIG. 8B as the point P9 moves along the direction A9. Besides, the user also can click and drag any point P9 in the right inputting area 850 to move along the direction A9 so as to show different right key sections. The direction A9 substantially is a clockwise direction or counterclockwise direction, and the direction A9' substantially is a clockwise direction or counterclockwise direction. In more detail, the touch screen 820 detects the sliding movement in the right inputting area 850, and then the right rotatable keyboard 870 rotates from a second angle to another second angle as the point P9 moves. Therefore, the right key section 872 corresponding to the second angle is immediately hidden while the right key section 871 or 874 corresponding to the another second angle is immediately shown. That is, the right key section 872 in FIG. 8A is automatically switched to the right key section 871 in FIG. 8B or the right key section 874 in FIG. 8C. Similarly, as the right rotatable keyboard 870 rotates, the left rotatable keyboard 860 rotates from the first angle to the another first angle. Therefore, the left key section 862 corresponding to the first angle is immediately hidden while the left key section 861 or 864 corresponding to the another first angle is immediately shown. That is, the left key section 862 in FIG. 8A is automatically switched to the left key section 861 in FIG. 8B or the left key section 864 in FIG. 8C.

The handheld electronic device and the operation method thereof according to the above-mentioned embodiments provide a virtual keyboard with several key sections. The user can rotate the virtual keyboard through the inputting area in the touch screen to quickly switch layout modes for showing different key sections. Besides, during the operation process, animation and sound effects can be generated responsive to the sliding movement of switching the key sections and responsive to the pressing movement on the shown key section, creating a fun and functional layout switching method that can provide users with endless entertainment while switching among the various layouts. Besides, user's two hands can correspond to the left and right inputting areas while holding the handheld electronic device so as to directly rotate the virtual keyboard for switching the key sections and to press the shown key sections to perform an input action by fingers.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld electronic device, comprising:
   a virtual keyboard, comprising a plurality of key sections; and
   a touch screen having an inputting area for showing one of the key sections, wherein when the touch screen detects a sliding movement from a user in the inputting area, the inputting area shows another one of the key sections without showing remaining ones of the key sections.

2. The handheld electronic device according to claim 1, wherein the inputting area is disposed at a lower portion of the touch screen so as to be directly touched by the user when the user holds the handheld electronic device.

3. The handheld electronic device according to claim 1, wherein each of the key sections is rectangular-shaped, sector-shaped, or spherical sector-shaped.

4. The handheld electronic device according to claim 1, wherein the key sections are arranged to be a pillar-shaped keyboard, a plate-shaped keyboard, or a sphere-shaped keyboard.

5. The handheld electronic device according to claim 1, wherein the key sections include an alphabet key section, a number key section, a symbol key section and a character key section.

6. The handheld electronic device according to claim 1, wherein the key sections have different bottom designs, different colors, or different typefaces.

7. The handheld electronic device according to claim 1, wherein the key sections includes a plurality of left key sections and a plurality of right key sections, the inputting areas includes a left inputting area for showing one of the left key sections and a right inputting area for showing one of the right key sections,
   wherein when the touch screen detects the sliding movement from the user in the left inputting area, the left inputting area shows another one of the left key sections; and
   wherein when the touch screen detects the sliding movement from the user in the right inputting area, the right inputting area shows another one of the right key sections.

8. The handheld electronic device according to claim 7, wherein the left inputting area and the right inputting area are disposed at a left corner and a right corner of the touch screen respectively so as to be directly touched by the user when the user holds the electronic device.

9. The handheld electronic device according to claim 7, wherein each of the left key sections is rectangular-shaped, sector-shaped, or spherical sector-shaped, and each of the right key sections is rectangular-shaped, sector-shaped, or spherical sector-shaped.

10. The handheld electronic device according to claim 7, wherein the left key sections are arranged to be a pillar-shaped keyboard, a plate-shaped keyboard, or a sphere-shaped keyboard, and the right key sections are arranged to be a pillar-shaped keyboard, a plate-shaped keyboard, or a sphere-shaped keyboard.

11. The operation method according to claim 1, wherein the sliding movement comprises a horizontal movement, a vertical movement, a clockwise movement, a counterclockwise movement, and a curvilinear movement.

12. An operating method of a handheld electronic device, comprising:
   actuating a virtual keyboard comprising a plurality of key sections, wherein a touch screen of the electronic device shows one of the key sections;
   detecting a sliding movement from a user in an inputting area;
   showing another one of the key sections without showing remaining ones of the key sections; and
   detecting a pressing movement in the another one of key sections from the user and performing an input action accordingly.

13. The operation method according to claim 12, wherein the step of detecting the sliding movement comprising:
   detecting the sliding movement in the inputting area, wherein the sliding movement is defined by a sliding point which moves along a direction in the inputting area; and
   the step of showing the another one of the key sections comprising:
   the virtual keyboard rotating from an angle to another angle as the sliding point moves; and
   hiding the one of the key sections corresponding to the angle and showing the another one of the key sections corresponding to the another angle.

14. The operation method according to claim 12 further comprising:
   generating a first sound responsive to the sliding movement of switching the key sections; and
   generating a second sound responsive to the pressing movement on the shown key section.

15. The operation method according to claim 12, wherein the inputting area includes a left inputting area and a right inputting area, and the key sections includes a plurality of left key sections and a plurality of right key sections, the step of detecting a sliding movement comprises:
   detecting the sliding movement in the left inputting area or the right inputting area; and
   the step of showing the another one of the key sections comprises:
   simultaneously showing the left inputting area corresponding to the left key sections and the right inputting area corresponding to the right key sections.

16. The operation method according to claim 12, wherein the sliding movement comprises a horizontal movement, a vertical movement, a clockwise movement, a counterclockwise movement, and a curvilinear movement.

17. The operation method according to claim 12 further comprising:
   generating a first sound responsive to the sliding movement of switching the left or right key sections; and
   generating a second sound responsive to the pressing movement on the shown left or right key section.

* * * * *